United States Patent [19]

Tanaka et al.

[11] 3,926,282
[45] Dec. 16, 1975

[54] EMERGENCY BRAKING SYSTEM
[75] Inventors: Hiroshi Tanaka, Musashino; Isao Morita, Tokyo, both of Japan
[73] Assignee: Caterpillar Mitsubshi Ltd., Tokyo, Japan
[22] Filed: Sept. 16, 1974
[21] Appl. No.: 506,398

[30] Foreign Application Priority Data
Sept. 19, 1973 Japan.............................. 48-108824

[52] U.S. Cl. ............................. 188/106 F; 188/170
[51] Int. Cl.² ......................................... F16D 65/32
[58] Field of Search ......... 188/106 F, 106 P, 106 R, 188/170, 171; 303/9

[56] References Cited
UNITED STATES PATENTS

| | | | |
|---|---|---|---|
| 1,662,183 | 3/1928 | Chann.............................. | 188/106 P |
| 3,093,213 | 6/1963 | Limoges et al. ................. | 188/106 P |
| 3,424,281 | 1/1969 | Kawabe et al... :............... | 188/106 F |
| 3,463,276 | 8/1969 | Brooks ............................ | 188/106 P |
| 3,485,537 | 12/1969 | Schlor et al. ................. | 188/106 F X |

Primary Examiner—Duane A. Reger
Attorney, Agent, or Firm—Phillips, Moore, Weissenberger Lempio & Strabala

[57] ABSTRACT

An emergency braking system of a vehicle provided with a hydraulic service brake in which oil pressure is supplied by a hydraulic system and which is operated by a foot pedal, comprising a detector means for detecting hydraulic pressure in the hydraulic system, means of restraint adapted to actuate the brake means of the emergency braking system only when the foot pedal is at least partially depressed. This emergency braking system functions when an operator depresses the foot pedal of the disabled hydraulic service brake.

4 Claims, 3 Drawing Figures

EMERGENCY BRAKING SYSTEM

The present invention relates to an emergency braking system of a vehicle and particularly an earth-moving or construction machine provided with a hydraulic service brake and particularly to an emergency braking system of a vehicle provided with a hydraulic service brake operated by a foot pedal with the supply of pressure oil from a hydraulic system.

Ordinarily, an earth-moving or construction machine is provided with a hydraulic service brake actuated by a foot pedal, and a parking brake mechanically operated by a lever.

A hydraulic service brake effectively functions when the vehicle engine functions to operate a hydraulic pump and supply fluid under pressure thereto, such hydraulic pump normally operating the steering system also. However, when an engine stops for some reasons and thereby the hydraulic pump becomes unworkable or oil presssure drops due to damage of piping in the hydraulic system, a hydraulic service brake becomes incapable of braking the vehicle effectively. In a hydraulic service brake, hydraulic pressure is increased as with a booster and brake means are operated by the increased pressure. Without proper supply of a fluid pressure oil, manual application of the brake means is exceedingly difficult and next to impossible particularly for a heavy-duty vehicle.

Accordingly, when hydraulic pressure in the hydraulic system drops due to engine troubles during movements of the vehicle on a slope, the vehicle gets into great danger. In such a case, an operator should operate a hand lever for a parking brake to brake a vehicle, but very often finds it difficult to fill instant needs. In such a case, an operator tends to depress a foot pedal for a hydraulic service brake forgetful of hand lever operation and would act on the hand brake in a belated operation. If in imminent danger, time loss in hand lever operation could result in an accident. Furthermore, with low hydraulic pressure in a hydraulic system, a malfunctioning hydraulically operated steering system could combine to increase the severity of an accident.

Japanese Utility Model Publication 12857/73 has proposed an emergency braking system to overcome the aforesaid shortcomings. The emergency braking system is provided with a valve to be actuated as hydraulic pressure in a hydraulic system drops below a given value, brake means being automatically actuated by the action of the valve when hydraulic pressure drops below a given value. The emergency braking system has surely decreased the defect to some extent but is still insufficient. In the prior art cited, an emergency brake is always actuated if hydraulic pressure in a hydraulic system drops below a given value irrespective of the operator control. That is, an emergency brake is automatically applied, in some cases before an operator brakes the vehicle in awareness of engine troubles, etc. Occurrence of an emergency braking action before an operator applies the brake is very dangerous to the operator. For example, if an emergency brake is actuated unexpectedly by an operator on a descent, there is danger of an operator being pounded on the chest or face with a steering wheel or other elements of the vehicle or being thrown out of the vehicle. In the Japanese Utility Model Publication cited above, a pulley mechanism is in use to actuate brake means which results in comparatively complicated and non compact structure.

It is the primary object of the present invention to provide an emergency braking system capable of being operated if an operator wants to brake a vehicle when hydraulic pressure in a hydraulic system drops for some reason, thereby rendering the hydraulic service brake inoperative.

Another object of the present invention is to provide an emergency braking system operated by depressing a foot pedal for a hydraulic service brake when a hydraulic service brake has been disabled.

Still another object of the present invention is to provide a highly reliable emergency braking system comparatively simple in structure.

It is a still further object of this invention to provide an emergency brake system which, while fulfilling the above objects, after actuation by the foot pedal, may be released by the hand lever operating the parking brake.

It is also an object of this invention to provide an emergency brake system operative only at the will of the operator.

Further objects and advantages of the present invention will become readily apparent as the following detailed description of the invention unfolds when taken in conjunction with the accompanying drawings.

Figure 1:
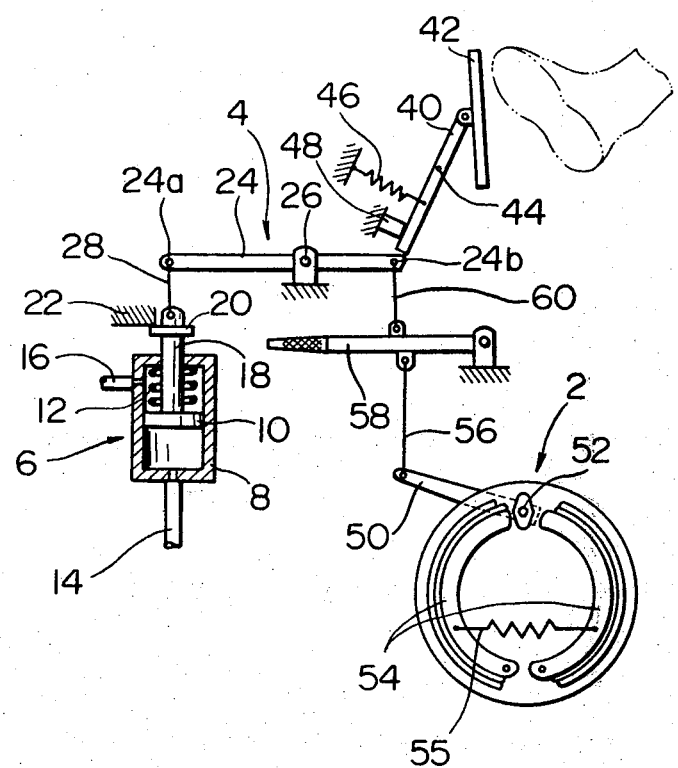
FIG. 1 is a schematic diagram showing one embodiment of an emergency braking system of the present invention.

In FIG. 1, the emergency braking system of the present invention comprises brake means 2, linkage 4 mechanically connected to brake means 2 to actuate the brake means and detector means 6 for applying a given force to linkage 4 as hydraulic pressure in a hydraulic system (not shown) of a vehicle drops below a given value.

In FIG. 1 detector means 6 comprises cylinder 8 secured to an appropriate location in the vehicle, piston 10 sliding within cylinder 8 and a spring-type actuator having compression spring 12 forcing piston 10 against the head side of cylinder 8. The head side of cylinder 8 is connected to a suitable portion of the hydraulic system through pipe 14 and subjected to hydraulic pressure in the hydraulic system. The rod side of cylinder 8 is connected to a reservoir (not shown) of the hydraulic system through pipe 16. Near the tip of rod 18 of piston 10 is secured flange 20. The flange is engaged with stopper 22 secured to the vehicle and restricts the upward movement of the piston. When hydraulic pressure in the hydraulic system is maintained above a predetermined amount, piston 10 is forced to a position where flange 20 is in registry with stopper 22 against the action of spring 12 by hydraulic pressure given to the head side of cylinder 8 as shown in FIG. 1.

Figure 2:
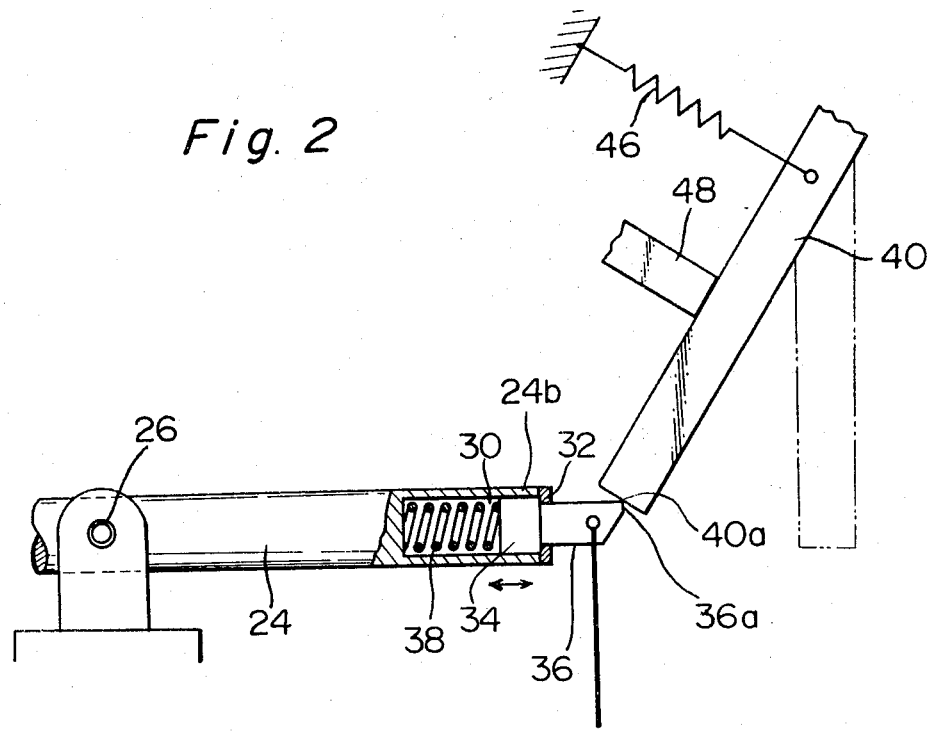
FIG. 2 shows an enlarged portion of the embodiment of FIG. 1.

Linkage 4 has link 24 pivotally mounted on the vehicle at point 26. One end 24a of link 24 is pivotally connected through flexible line 28 or directly to the outer end of piston rod 18. At the other end 24b of link 24 is formed bore 30 as shown in FIG. 2. end plate 32 having a smaller opening than the cross sectional area of bore 30 is secured to the open end of bore 30. Within bore 30 is slidably arranged plunger 34 having projection 36 capable of protruding through the opening of end plate 32. In FIG. 2, plunger 34 is urged against the right side with compression spring 38 placed within bore 30. Projection 36 of plunger 34 is of a knife-like form as shown in FIG. 2 and engaged with free end 40a of lever 40 of a well-known type. Tip 36a of projection 36 engaged with free end 40a of lever 40 is preferably spherical for smooth contact.

The other end of lever 40 is connected to foot pedal 42 for operating a well-known hydraulic service brake (not shown) (See FIG. 1). The lever is pivotally mounted on the vehicle at point 44 disposed in the middle portion of the lever. Lever 40 is forced clockwise with tension spring 46 which is secured to the vehicle at one end and to the lower part of lever 40 at the other end. Lever 40 engages a stopper 48 which is secured to the vehicle. The lever is normally held in position as shown by a solid line in FIG. 2. If foot pedal 42 is depressed, lever 40 is turned counterclockwise around point 44 and positioned as shown by a two-dot chain line in FIG. 2. Lever 40 of a well-known type is connected to a control valve (not shown) of a hydraulic service brake and if it is turned counterclockwise with foot pedal 42 from the position shown by a solid line in FIG. 2, it actuates a hydraulic service brake.

When lever 40 is located as shown by a solid line in FIG. 2, that is, when foot pedal 42 is not depressed tip 36a of projection 36 of plunger 34 is engaged with free end 40a of lever 40 and hence link 24 cannot turn counterclockwise around point 26. If tip 36a of projection 36 is disengaged from free end 40a of lever 40 by depression of foot pedal 42, link 24 may turn counterclockwise around point 26.

Brake means 2 comprises an internal expanding brake having actuating lever 50, cam 52 secured to the actuating lever, a pair of brake shoes 54 operated with cam 52 and tension spring 55 urging the brake shoes in the contraction state, well known as brake means of a parking brake.

In FIG. 1 lever 50 of brake means 2 is connected to hand lever 58 through a member such as flexible wire 56. Hand lever 58 is well known and is provided with a detent (not shown). The hand lever is connected to linkage 4 by flexible wire 60, preferably to projection 36 of plunger 34. Such a mechanism is very convenient now that brake means 2 functions not only, as a brake of the emergency braking system but also as that of a parking brake operated by hand lever 58.

Figure 3:
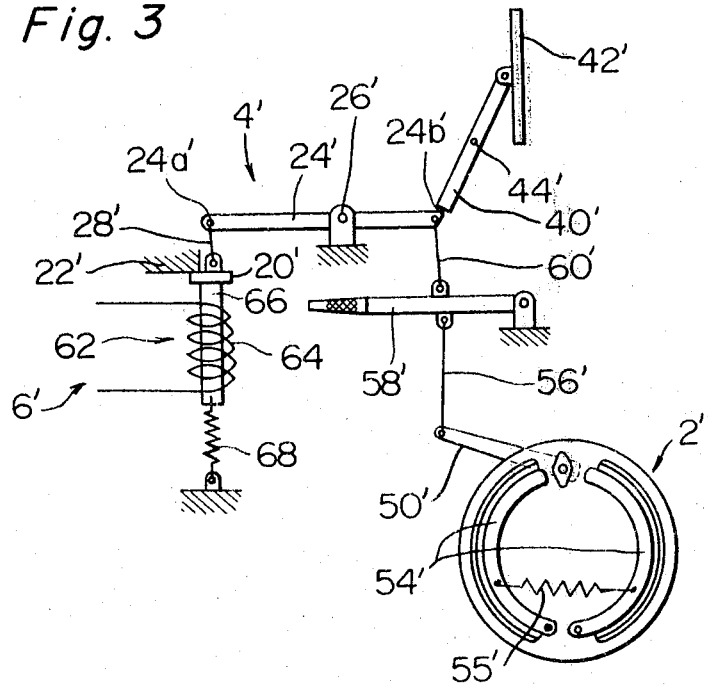
FIG. 3 shows another embodiment of an emergency braking system of the present invention.

In FIG. 3 another embodiment of the emergency braking system of the present invention will be described below. Like reference numerals with primes refer to like components in FIG. 1. The embodiment of FIG. 3 is distinguished from that of FIGS. 1 and 2 only in that detector means 6' is an electric means having a solenoid.

Detector means 6' in FIG. 3 has solenoid 62 having coil 64 and iron core 66.

Iron core 66 is urged downward by tension spring 68 one end of which is secured to the vehicle and the other end of which is secured to the lower end of iron core 66. Flange 20' is in registry with stopper 22' similar to stopper 22 in FIG. 1 and secured near the upper end of iron core 66 to keep iron core 66 from moving upward. Coil 64 is given electricity with an appropriate control system (not shown) from an electric generator arranged in the vehicle when hydraulic pressure in the hydraulic system of the vehicle is maintained to a given pressure. The control system stops supplying electricity to coil 64 when hydraulic pressure in the hydraulic system drops below a given value. Hence by the attractive power of coil 64, iron core 66 is attracted upward against the action of tension spring 68 to a position where flange 20' is in registry with stopper 22' and held in the state as shown in FIG. 3.

Operations of an emergency braking system of the present invention will be described below.

In FIGS. 1 and 2, if hydraulic pressure in the hydraulic system is high enough to actuate a hydraulic service brake operated by foot pedal 42, piston 10 is held in the upper limit position by hydraulic pressure supplied to the head side of cylinder 8 and hence detector means 6 does not affect linkage 4. Under such circumstances, a hydraulic service brake can be actuated by depression of foot pedal 42 to brake the vehicle.

When hydraulic pressure drops below a given pressure due to engine troubles, etc., during the operation of the vehicle, hydraulic pressure fed to the head side of cylinder 8 becomes less than the force of spring 12, which in turn urges piston 10 downwardly. Since rod 18 of piston 10 is connected to the left end 24a of link 24 through member 28, this force tries to turn link 24 anticlockwise around point 26. However, without depression of foot pedal 42, projection 36 of plunger 34 at the right end of link 24 is in registry with the free end of lever 40 and hence link 24 may not turn counterclockwise regardless of the aforesaid force and consequently an emergency brake will not function against expectation of an operator. If under such circumstances an operator notices engine troubles and depresses foot pedal 42 to brake the vehicle, lever 40 turns counterclockwise around point 44 and presents a state as shown by a two-dot chain line in FIG. 2, resulting in the free end of lever 40 being disengaged from the projecting end of plunger 34. Thus spring 12 forces piston 10 downward and turns link 24 counterclockwise. As link 24 is turned counterclockwise, hand lever 58 is turned clockwise and the lever of brake means 2 is pulled to expand brake shoes 54 and brakes the vehicle. Accordingly when with the depression of the foot pedal, a hydraulic service brake does not function on account of hydraulic pressure drop in the hydraulic system, an emergency braking system is always actuated.

The brake means of the emergency braking system once actuated is kept actuated by the detent of hand lever 58 even if hydraulic pressure in the hydraulic system has returned to normal operating pressure. In releasing the brake, hand lever 58 is manually operated to release the action of the detent; it is counterclockwise turned to contract brake shoes 54. When hand lever 58 turns counterclockwise, link 24 is turned clockwise and the state in FIGS. 1 and 2 is recovered. In this case, even if lever 40 is positioned as shown by a solid line in FIG. 2 without depression of foot pedal 42, plunger 34 can retract against spring 38 by its registry with the free end of lever 40. It is evident that link 24 is returned to the state in FIGS. 1 and 2.

Further it is evident that regardless of the hydraulic pressure in the hydraulic system or the depression of a foot pedal, hand lever 58 can be manually turned counterclockwise to actuate brake means 2. In this case, since hand lever 58 is connected to projection 36 of the plunger at the right end of link 24 by means of flexible wire 60, the counterclockwise turn of the hand lever does not affect link 24 at all. Brake means 2 functions as that of the emergency braking system and as that of the parking brake operated by a hand lever as well.

In an embodiment as shown in the drawings, brake means 2 can be actuated only with the depression of a foot pedal 42 instead of operating a hand lever 58 in stopping the operation of a vehicle and parking it, because if the operation of an engine is stopped, hydraulic pressure in the hydraulic system naturally drops.

The operation of an embodiment as shown in FIG. 3 is almost the same as that of FIGS. 1 and 2. In FIG. 3, with not only pressure drop in the hydraulic system but also no electric supply to coil 62 due to troubles in the electric system of a vehicle, an emergency braking system is placed in condition for actuation.

Such are the descriptions of the present invention with respect to two embodiments, none of which are to be construed as in limitation of the invention, since it will be apparent that many widely different embodiments can be resorted to without departing from the spirit and scope of the invention.

What we claim is:

1. In a vehicle provided with a pressurized hydraulic system, having a brake pedal, a pivotally mounted brake lever associated with said brake pedal and service brakes operatively controlled by depressing said brake pedal and activated by said hydraulic system, an emergency brake system comprising:

separate brake means operable for stopping said vehicle independently of said service brakes;

detector and actuator means connected to the hydraulic system for sensing a loss of pressure in said hydraulic system;

linkage means connecting said separate brake means to said detector and actuator means for operating said separate brake means when said detector and actuator means senses a loss of hydraulic pressure; and mechanical interlock means associated with said linkage means and operable to prevent application of said separate brake system until said brake pedal is at least partially depressed.

2. The emergency brake system as set forth in claim 1 wherein the linkage means includes a rigid link member pivotally mounted on said vehicle so that one end is adjacent to the brake lever and further wherein the mechanical interlock means includes a plunger slidably contained in a cavity in said one end of the rigid link member, and resilient means disposed in said cavity for urging said plunger in a direction outward of said cavity to engage said brake lever when the brake pedal is not depressed, said plunger having a cammed surface for driving said plunger inwardly if said brake pedal is not depressed and when the separate brake means are released thereby allowing said interlock means to be reset.

3. The emergency brake system as set forth in claim 2 further comprising a hand lever operably connected in said linkage means and wherein linkage means further includes an overtravel linkage allowing said hand lever to actuate the separate brake means independent of the detector and actuator means.

4. The emergency brake system as set forth in claim 3 wherein the overtravel linkage comprises:

a flexible link member connecting the hand lever with the rigid link.

* * * * *